Oct. 18, 1938. J. R. THORP Re. 20,890

STEERING WHEEL SPINNER KNOB

Original Filed Nov. 30, 1936

INVENTOR.
BY Joel R. Thorp
Morsell, Lieber & Morsell
ATTORNEYS.

Reissued Oct. 18, 1938

Re. 20,890

UNITED STATES PATENT OFFICE 20,890

STEERING WHEEL SPINNER KNOB

Joel R. Thorp, West Allis, Wis., assignor to The Fulton Company, West Allis, Wis., a corporation of Wisconsin Original No. 2,101,519, dated December 7, 1937, Serial No. 113,283, November 30, 1936. Application for reissue August 29, 1938, Serial No. 227,391

7 Claims. (Cl. 74—557)

The present invention relates generally to improvements in appliances for facilitating manipulation of the steering wheels of vehicles, and relates more specifically to improvements in the construction and operation of spinner knob attachments cooperable with the peripheral rims of steering wheels or the like in order to effect more convenient and rapid operation of such wheels under certain conditions of use.

Generally defined, an object of my present invention is to provide an improved steering wheel spinner knob which is simple in construction and highly efficient in use.

It has heretofore been proposed to provide so-called spinner knob attachments for the steering wheels of vehicles, these prior knob assemblages either being attachable to the tops of the steering wheel gripping rims with the aid of wood screws, or being formed for detachable clamping to spokes of the wheels near the gripping rims, and serving to permit more convenient and rapid turning of the steering wheels when extreme movement or displacement thereof is required. The type of prior spinner knob assembly wherein the supporting bracket is attached to the steering wheel rim with rim penetrating screws, is not only objectionable because the screws mar the wheel rim and prevent quick alteration in the position of the knob about the axis of the wheel, but also because the bracket materially interferes with normal direct gripping of the wheel rim and obstructs free sliding of the operator's clasped hands about the rim periphery. The other type of prior spinner knob assembly wherein the supporting bracket is attachable by clamping to a spoke of the steering wheel, while permitting more convenient and rigid attachment of the knob assemblage, does not permit disposition thereof at any desired and most convenient location relative to the wheel axis and is especially objectionable for this reason when the device is to be applied to a steering wheel having only a few spokes. The prior appliances are therefore relatively objectionable for various reasons, and are not universally attachable and conveniently adjustable without damaging the steering wheels.

It is therefore an object of my present invention to provide an improved steering wheel knob attachment which may be conveniently firmly clamped to any desired peripheral portion of the wheel, and which entirely avoids undesirable obstruction to normal peripheral gripping of the wheel.

Another specific object of this invention is the provision of an improved spinner knob unit which is durable and compact in construction, and which presents a neat and highly finished appearance when applied as an accessory to the steering wheel of any vehicle.

A further specific object of the invention is to provide a steering wheel knob assembly having few parts and requiring no attention after initial proper installation thereof, and which may be conveniently and firmly applied to any steering wheel by a novice.

Still another specific object of my invention is the provision of a new and useful steering wheel spinner accessory which may be readily manufactured and assembled, and which may also be sold at moderate prices.

These and other specific objects and advantages will be apparent from the following detailed description.

A clear conception of embodiments of the several features constituting the present improvement, and of the mode of constructing and of applying and utilizing steering wheel spinner knobs built in accordance with the invention, may be had by referring to the drawing accompanying and forming a part of this specification wherein like reference characters designate the same or similar parts in the various views.

Figure 1:
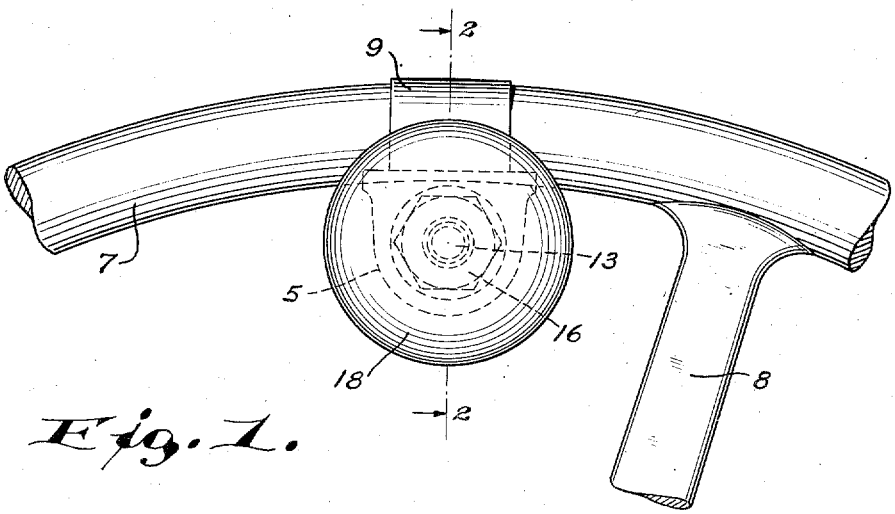
Fig. 1 is a full top view of one of the improved knob attachments, showing the same clamped to a fragment of the rim of a standard automobile steering wheel near one of the spokes.
Figure 3:
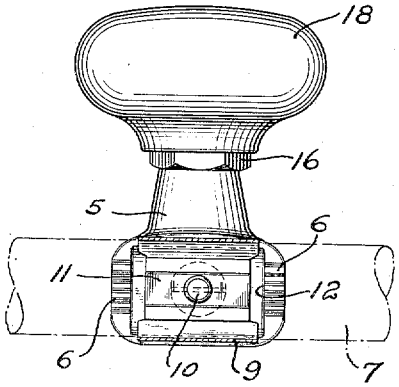
Fig. 3 is a vertical section through the clamping strap taken along the line 3—3 of Fig. 2, and a side view of the knob assembly, the steering wheel rim being shown in dot-and-dash lines.

While I have shown a type of spinner knob assemblage which is especially adapted for attachment as an accessory to the rim of a standard automobile steering wheel, it is not the intent to thereby unnecessarily restrict the scope, since the improvement is more generally applicable to the steering wheels of vehicles for land, air or water.

Referring to the drawing, the improved steering wheel spinner knob assembly or unit shown therein by way of illustration, comprises in general a supporting bracket 5 having side teeth 6 formed for coaction with the inner side of the rim 7 of a standard steering wheel anywhere between the successive spokes 8 of the wheel; a clamping band or strap 9 embracing the steering wheel rim 7 and cooperable with the teeth 6 to firmly clamp the bracket 5 in the desired position; an adjusting screw 10 coacting with the strap 9 and with a block 11 disposed within a recess 12 in the lower portion of the bracket 5 to tension the clamping strap; a pivot pin 13 rigidly attached within a bore in the upper portion of the bracket 5 and having a journal portion 14 and an upper end enlargement or head 15; an externally threaded sleeve 16 rotatably embracing the journal portion 14 of the pin 13 and being constantly resiliently urged against the upper end head 15 by a spring washer 17 interposed between the lower sleeve end and the top of the bracket 5; and a gripping knob 18 having a threaded bore coacting with the threaded exterior of the sleeve 16.

Figure 2:
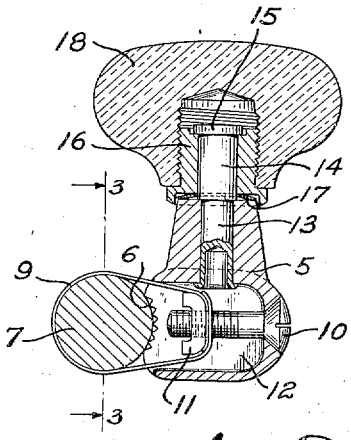
Fig. 2 is a vertical central section through the assemblage of Fig. 1, taken along the line 2—2 but showing the strap clamp in full.

The supporting element or bracket 5 is preferably formed of metal and may be constructed as a die casting; and the clamping band or strap 9 is formed of sheet metal and has one end permanently secured to the block 11 while the opposite end thereof is free to be swung away from the block when the screw 10 is withdrawn, in order to permit application of the strap to the steering wheel rim 7. The block 11 and the overlapping ends of the strap 9 are insertible within the recess 12 of the bracket 5 from the side of the latter, and the two sets of gripping teeth 6 are disposed equi-distant from the axis of the clamping screw 10 so that when the latter is manipulated to effect clamping, the pressure on all of the teeth 6 is substantially equalized. The upright post or pin 13 may be riveted or otherwise rigidly attached to the bracket 5 as shown in Fig. 2, and the spring washer 17 is preferably formed slightly conical so as to engage the lower portion of the sleeve 16 substantially along an annular line and to thus avoid excessive friction. The rotary sleeve 16 which is also formed of metal, has a hexagonal lower end which facilitates assembly and which is recessed to provide a downwardly projecting lip for normally concealing the washer 17. The knob 18 may be formed of any suitable light, but durable material, and the entire attachment is preferably plated and polished to present a highly attractive appearance.

When it is desired to attach the improved accessory to the rim 7 of a steering wheel, it is only necessary to release the screw 10 so as to permit withdrawal of the block 11 and the clamping strap 9 from within the recess 12. The strap 9 may then be spread and positioned around the rim 7, whereupon the block 11 and the strap ends may be reinserted within the recess 12 and the screw 10 may be applied to the threaded central hole in the block to hold the assemblage together. The loosely assembled structure may thereafter be shifted along the rim 7 to any desired position, and may also be swung about this wheel rim so as to position the pin 13 substantially perpendicular to the plane of the rim 7, whereupon the screw 10 should be actuated to place the strap 9 under final tension to firmly clamp the bracket 5 to the rim.

After the knob assembly has been thus properly applied to the steering wheel rim 7 at the desired location, the wheel may be rotated at will, either by gripping the rim 7 directly with the hands, or by grasping the knob 18 and using the latter as a crank handle. The latter operation is ordinarily desirable when it becomes necessary to quickly turn the wheel as when turning corners or when backing into limited parking space. When the grasping member or knob 18 is being used to rotate the steering wheel, the sleeve 16 rotates upon the pin 13, and free rotation is permitted by the spring washer 17 which however constantly eliminates relative vertical movement between the knob 18 and the bracket 5 and thus avoids rattling. By virtue of the fact that the improved spinner knob attachment is located at the inner side of the rim 7, and that a relatively thin strap 9 is employed for clamping purposes, the external peripheral portion of the rim 7 is left substantially free from obstruction against normal gripping, and the operator may manipulate the steering wheel in the usual manner by sliding his hands circumferentially around the wheel and by gripping any portion of the rim. By virtue of the convenient releasability of the clamp, and the sliding coaction between the strap 9 and the rim 7, the improved assemblage may also be readily adjusted to any desired position about the wheel periphery, and the device may also be removed without marring the rim 7.

From the foregoing specific description, it will be apparent that the present invention provides an improved spinner knob assembly which is simple, compact and durable in construction, and which is also readily attachable and highly efficient in use. The improved appliance, besides being universally adjustable and applicable, is unobstructive and conveniently manipulable, and presents a very attractive appearance. The assemblage has relatively few parts, none of which are subject to excessive wear, and may obviously be readily manufactured and sold at moderate cost.

It should be understood that it is not desired to unnecessarily limit the invention to the exact details of construction herein shown and described, for various modifications within the scope of the claims may occur to persons skilled in the art.

I claim:—

1. A steering wheel attachment, comprising, a bracket having a lateral recess and spaced gripping portions on opposite sides of said recess formed for coaction with the inner side of the steering wheel rim, a clamping strap snugly embracing the outside and top and bottom of the rim between said gripping portions and having its ends overlapped and disposed within said recess, adjustable means coacting with said overlapped strap ends and with said bracket to pull said strap into clamping engagement with the rim and to simultaneously force said gripping portions against the rim, a journal pin secured to said bracket and projecting upwardly therefrom, and a knob rotatably supported by said pin.

2. A steering wheel attachment, comprising, a bracket having a lateral recess and spaced gripping portions on opposite sides of said recess formed for coaction with the inner side of the steering wheel rim, a clamping strap snugly embracing the outside and top and bottom of the rim between said gripping portions and having its ends overlapped and disposed within said recess, adjustable means coacting with said overlapped strap ends and with said bracket to pull said strap into clamping engagement with the rim and to simultaneously force said gripping portions against the rim, a journal pin secured to said bracket within said recess and projecting upwardly therefrom, said pin having an integral head at its upper extremity, and a knob having a supporting sleeve journalled on said pin between said head and the upper end of said bracket.

3. A steering wheel attachment, comprising, a one-piece bracket having a lateral recess and horizontally spaced gripping portions on opposite sides of said recess formed for coaction with the inner side of the steering wheel rim, a thin and relatively flexible clamping strap snugly embracing the outside and top and bottom of the rim between said gripping portions and having its ends overlapped and provided with alined holes within said recess, a threaded block disposed within said strap and coacting with said overlapped ends, a screw piercing said holes and coacting with said block and with said bracket to pull said strap into clamping engagement with the rim and, to simultaneously force said gripping portions against the rim, a journal pin secured to said bracket and projecting upwardly therefrom, and a knob rotatably supported by said pin.

4. A steering wheel attachment, comprising, a one-piece bracket having a lateral recess and horizontally spaced gripping portions on opposite sides of said recess formed for coaction with the inner side of the steering wheel rim, a thin and relatively flexible clamping strap snugly embracing the outside and top and bottom of the rim between said gripping portions and having its ends overlapped and provided with alined holes within said recess, a threaded block disposed within said strap and coacting with said overlapped ends, a screw piercing said holes and coacting with said block and with said bracket to pull said strap into clamping engagement with the rim and to simultaneously force said gripping portions against the rim, a journal pin secured to said bracket within said recess and projecting upwardly therefrom, said pin having an integral head at its upper extremity, and a knob having a supporting sleeve journalled on said pin between said head and the upper end of said bracket.

5. A steering wheel attachment, comprising, a bracket having a lateral recess and spaced gripping portions on opposite sides of said recess formed for coaction with the inner side of the steering wheel rim, a clamping strap snugly embracing the outside and top and bottom of the rim between said gripping portions and having its ends extended into said recess, adjustable means coacting with said strap ends within said recess and with said bracket to pull said strap into clamping engagement with the rim and to simultaneously force said gripping portions against the rim, a journal pin secured to said bracket within said recess and projecting upwardly therefrom, said pin having an integral head at its upper extremity, and a knob having a supporting sleeve journalled on said pin between said head and the upper end of said bracket.

6. A steering wheel attachment, comprising, a bracket having a lateral recess and spaced gripping portions on opposite sides of said recess formed for coaction with one side of the steering wheel rim, a clamping strap snugly embracing the opposite side and top and bottom of the rim between said gripping portions and having its ends extended into said recess, adjustable means coacting with said strap ends within said recess and with said bracket to pull said strap into clamping engagement with the rim and to simultaneously force said gripping portions against the rim, a journal pin secured to said bracket and projecting upwardly therefrom, and a knob rotatably supported by said pin.

7. A steering wheel attachment, comprising, a bracket having a lateral recess and spaced gripping portions on opposite sides of said recess formed for coaction with one side of the steering wheel rim, a clamping strap snugly embracing the opposite side and top and bottom of the rim between said gripping portions and having its ends extended into said recess, adjustable means coacting with said strap ends within said recess and with said bracket to pull said strap into clamping engagement with the rim and to simultaneously force said gripping portion against the rim, and a knob journalled for rotation upon said bracket.

JOEL R. THORP.